US007747463B1

(12) United States Patent
Phillips et al.

(10) Patent No.: US 7,747,463 B1

(45) **Date of Patent: *Jun. 29, 2010**

(54) DEBIT PURCHASING OF STORED VALUE CARD FOR USE BY AND/OR DELIVERY TO OTHERS

(75) Inventors: Gregory Joseph Phillips, Landenberg, PA (US); Rebecca Deporte, Landenberg, PA (US); Jeffrey Norwine, Wilmington, DE (US); Penny Joines, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/106,407

(22) Filed: Apr. 21, 2008

Related U.S. Application Data

(63) Continuation of application No. 10/987,086, filed on Nov. 15, 2004, now Pat. No. 7,363,273, which is a continuation of application No. 10/441,067, filed on May 20, 2003, now Pat. No. 6,892,187, which is a continuation of application No. 09/102,044, filed on Jun. 22, 1998, now Pat. No. 6,615,189.

(51) Int. Cl.
*G06Q 30/00* (2006.01)
*G06Q 40/00* (2006.01)

(52) U.S. Cl. ...................................... 705/14.31; 705/41

(58) Field of Classification Search .................. 705/14, 705/41

See application file for complete search history.

(56) References Cited

U.S. PATENT DOCUMENTS

| | | | |
|---|---|---|---|
| 3,634,669 | A | 1/1972 | Soumas |
| 3,713,235 | A | 1/1973 | Roberts |
| 3,946,206 | A | 3/1976 | Darjany |
| 4,047,033 | A | 9/1977 | Malmberg et al. |
| 4,058,220 | A | 11/1977 | Torongo |
| D248,203 | S | 6/1978 | Morse |

(Continued)

FOREIGN PATENT DOCUMENTS

| | | |
|---|---|---|
| CA | 2293321 | 12/1998 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks for ID, TIme Magazine, Apr. 12, 2004, 1 page.

A Store Card Issuer Looks for Lift from Electronic Gift Certificates, Credit Card News, Feb. 1, 1995, 2 pages.

(Continued)

*Primary Examiner*—Susanna M Diaz
(74) *Attorney, Agent, or Firm*—Hunton & Williams LLP

(57) ABSTRACT

A method of issuing a purchase card is provided. The method includes the steps of presenting a purchaser with the opportunity to buy the purchase card, determining whether the purchaser has sufficient funds to pay for the purchase card, creating a purchase card account for a recipient designated by the purchaser, and issuing the purchase card. The purchase card may also be issued in connection with another credit card, for example as a rebate for purchases on the credit card. The purchase card may also be converted to a credit card.

24 Claims, 2 Drawing Sheets

U.S. PATENT DOCUMENTS 4,130,881 A 12/1978 Haessler et al.
4,465,206 A 8/1984 Sorel et al.
4,545,838 A 10/1985 Minkus et al.
4,582,985 A 4/1986 Lofberg
4,614,861 A 9/1986 Pavlov et al.
4,634,845 A 1/1987 Riley et al.
4,643,452 A 2/1987 Chang et al.
4,689,478 A 8/1987 Hale et al.
4,700,055 A 10/1987 Kashkashian, Jr.
4,722,054 A 1/1988 Yorozu et al.
4,746,787 A 5/1988 Okada et al.
4,750,119 A 6/1988 Robertson et al.
4,752,676 A 6/1988 Leonard et al.
4,754,418 A 6/1988 Hara
4,766,293 A 8/1988 Boston
4,766,539 A 8/1988 Fox
4,789,928 A 12/1988 Fujisaki
4,822,985 A 4/1989 Boggan et al.
4,831,242 A 5/1989 Englehardt
4,831,526 A 5/1989 Luchs
4,837,422 A 6/1989 Dethloff et al.
4,868,376 A 9/1989 Lessin et al.
4,870,259 A 9/1989 Boggan et al.
4,882,675 A 11/1989 Nichtberger et al.
4,897,533 A 1/1990 Lyszczarz
D305,887 S 2/1990 Nishimura
4,906,826 A 3/1990 Spencer
4,908,521 A 3/1990 Boggan et al.
4,923,288 A 5/1990 Allen et al.
4,928,001 A 5/1990 Masada
4,941,090 A 7/1990 McCarthy
4,943,707 A 7/1990 Boggan
4,953,085 A 8/1990 Atkins
4,954,985 A 9/1990 Yamazaki
4,961,142 A 10/1990 Elliott et al.
4,968,873 A 11/1990 Dethloff et al.
4,975,840 A 12/1990 DeTore et al.
4,978,401 A 12/1990 Bonomi
4,992,940 A 2/1991 Dworkin
5,025,372 A 6/1991 Burton et al.
5,049,728 A 9/1991 Rovin
5,055,662 A 10/1991 Hasegawa
5,080,748 A 1/1992 Bonomi
5,095,194 A 3/1992 Barbanell
5,117,355 A 5/1992 McCarthy
5,146,068 A 9/1992 Ugawa et al.
5,175,416 A 12/1992 Mansvelt
5,177,342 A 1/1993 Adams
5,180,901 A 1/1993 Hiramatsu
5,185,697 A 2/1993 Jacobs et al.
5,191,522 A 3/1993 Bosco et al.
5,192,947 A 3/1993 Neustein
5,202,286 A 4/1993 Nakatani
5,202,826 A 4/1993 McCarthy
5,206,488 A 4/1993 Teicher
5,206,803 A 4/1993 Vitagliano
5,214,700 A 5/1993 Pinkas et al.
5,218,631 A 6/1993 Katz
5,247,190 A 9/1993 Friend et al.
5,276,311 A 1/1994 Hartmut
5,287,268 A 2/1994 McCarthy
5,287,269 A 2/1994 Dorrough et al.
5,297,026 A 3/1994 Hoffman
5,311,594 A 5/1994 Penzias
5,321,241 A 6/1994 Craine
5,326,959 A 7/1994 Perazza
5,326,960 A 7/1994 Tannenbaum
5,328,809 A 7/1994 Holmes et al.
5,339,239 A 8/1994 Manabe et al.
5,349,633 A 9/1994 Katz
5,350,906 A 9/1994 Brody et al.
5,359,183 A 10/1994 Skodlar
5,361,062 A 11/1994 Weiss et al.
5,365,575 A 11/1994 Katz
5,383,113 A 1/1995 Kight
5,397,881 A 3/1995 Mannik
5,399,502 A 3/1995 Friend et al.
5,401,827 A 3/1995 Holmes et al.
RE34,915 E 4/1995 Nichtberger et al.
5,409,092 A 4/1995 Itako et al.
5,412,192 A 5/1995 Hoss
5,424,524 A 6/1995 Ruppert et al.
5,440,108 A 8/1995 Tran et al.
5,450,477 A 9/1995 Amarant et al.
5,453,601 A 9/1995 Rosen
5,455,407 A 10/1995 Rosen
5,457,305 A 10/1995 Akel et al.
5,459,306 A 10/1995 Stein et al.
5,465,206 A 11/1995 Hilt et al.
5,466,919 A 11/1995 Hovakimian
5,471,669 A 11/1995 Lidman
5,477,038 A 12/1995 Levine et al.
5,477,040 A 12/1995 Lalonde
5,479,494 A 12/1995 Clitherow
5,482,139 A 1/1996 Rivalto
5,483,444 A 1/1996 Malark et al.
5,483,445 A 1/1996 Pickering
5,489,123 A * 2/1996 Roshkoff .................... 283/81
5,500,514 A 3/1996 Veeneman et al.
5,503,891 A 4/1996 Marshall et al.
5,511,114 A 4/1996 Stimson et al.
5,512,654 A 4/1996 Holmes et al.
5,513,102 A 4/1996 Auriemma
5,521,363 A 5/1996 Tannenbaum
5,530,232 A 6/1996 Taylor
5,530,235 A 6/1996 Stefik et al.
5,537,314 A 7/1996 Kanter
5,544,086 A 8/1996 Davis et al.
5,544,246 A 8/1996 Mandelbaum et al.
5,553,120 A 9/1996 Katz
5,557,516 A 9/1996 Hogan
5,563,934 A 10/1996 Eda
5,577,109 A 11/1996 Stimson et al.
5,578,808 A 11/1996 Taylor
5,581,064 A 12/1996 Riley et al.
5,585,787 A 12/1996 Wallerstein
5,590,038 A 12/1996 Pitroda
5,592,560 A 1/1997 Deaton et al.
5,604,542 A 2/1997 Dedrick
5,608,785 A 3/1997 Kasday
5,612,868 A 3/1997 Off
5,619,558 A 4/1997 Jheeta
5,621,201 A 4/1997 Langhans et al.
5,621,787 A 4/1997 McKoy et al.
5,621,812 A 4/1997 Deaton et al.
5,637,845 A 6/1997 Kolls
5,638,457 A 6/1997 Deaton et al.
5,642,279 A 6/1997 Stone et al.
5,642,485 A 6/1997 Deaton et al.
5,644,723 A 7/1997 Deaton et al.
5,644,727 A 7/1997 Atkins
5,649,114 A 7/1997 Deaton et al.
5,649,117 A 7/1997 Landry
5,649,118 A 7/1997 Carlisle et al.
5,650,604 A 7/1997 Marcous et al.
5,653,914 A 8/1997 Holmes et al.
5,659,741 A 8/1997 Eberhardt
5,664,110 A 9/1997 Green et al.
5,664,157 A 9/1997 Takahira et al.
5,665,953 A 9/1997 Mazzamuto
5,672,678 A 9/1997 Holmes et al.
5,675,607 A 10/1997 Alesio et al.
5,675,662 A 10/1997 Deaton et al.
5,677,955 A 10/1997 Doggett et al.

5,684,291 A 11/1997 Taskett
5,687,322 A 11/1997 Deaton et al.
5,689,100 A 11/1997 Carrithers et al.
5,689,650 A 11/1997 McClelland et al.
5,692,132 A 11/1997 Hogan
5,696,907 A 12/1997 Tom
5,699,528 A 12/1997 Hogan
5,703,344 A 12/1997 Bezy et al.
5,704,046 A 12/1997 Hogan
5,705,798 A 1/1998 Tarbox
5,708,422 A 1/1998 Blonder et al.
5,710,458 A 1/1998 Iwasaki
5,710,886 A 1/1998 Christensen et al.
5,710,887 A 1/1998 Chelliah et al.
5,710,889 A 1/1998 Clark et al.
5,715,399 A 2/1998 Bezos
5,717,925 A 2/1998 Harper et al.
5,721,768 A 2/1998 Stimson et al.
5,721,781 A 2/1998 Deo et al.
5,726,884 A 3/1998 Sturgeon et al.
5,727,153 A 3/1998 Powell
5,728,998 A 3/1998 Novis et al.
5,729,693 A 3/1998 Holda-Fleck
5,734,154 A 3/1998 Jachimowicz et al.
5,734,838 A 3/1998 Robinson
5,736,728 A 4/1998 Matsubara
5,737,421 A 4/1998 Audebert
5,740,549 A 4/1998 Reilly et al.
5,742,775 A 4/1998 King
5,745,049 A 4/1998 Akiyama et al.
5,745,706 A 4/1998 Wolfberg et al.
5,749,075 A 5/1998 Toader et al.
5,760,381 A 6/1998 Stich et al.
5,765,138 A 6/1998 Aycock et al.
5,765,141 A 6/1998 Spector
5,770,843 A 6/1998 Rose et al.
5,770,849 A 6/1998 Novis et al.
5,774,870 A 6/1998 Storey
5,777,305 A 7/1998 Smith et al.
5,777,306 A 7/1998 Masuda
5,777,903 A 7/1998 Piosenka et al.
5,778,067 A 7/1998 Jones et al.
5,787,156 A 7/1998 Katz
5,787,404 A 7/1998 Fernandez-Holmann
5,789,733 A 8/1998 Jachimowicz et al.
5,790,636 A 8/1998 Marshall
5,794,207 A 8/1998 Walker
5,798,950 A 8/1998 Fitzgerald
5,799,087 A 8/1998 Rosen
5,802,176 A 9/1998 Audebert
5,805,719 A 9/1998 Pare et al.
5,806,042 A 9/1998 Kelly et al.
5,806,044 A 9/1998 Powell
5,806,045 A 9/1998 Biorge
5,807,627 A 9/1998 Friend et al.
5,809,478 A 9/1998 Greco
5,814,796 A 9/1998 Benson et al.
5,815,657 A 9/1998 Williams et al.
5,815,658 A 9/1998 Kuriyama
5,819,234 A 10/1998 Slavin et al.
5,819,237 A 10/1998 Garman
5,826,243 A 10/1998 Musmanno et al.
5,832,457 A 11/1998 O'Brien et al.
5,832,488 A 11/1998 Eberhardt
5,835,061 A 11/1998 Stewart
5,835,576 A 11/1998 Katz
5,839,113 A 11/1998 Federau et al.
5,845,259 A 12/1998 West et al.
5,845,260 A 12/1998 Nakano et al.
5,852,811 A 12/1998 Atkins
5,852,812 A 12/1998 Reeder
5,857,079 A 1/1999 Claus et al.
5,857,175 A 1/1999 Day
5,857,709 A 1/1999 Chock
5,859,419 A 1/1999 Wynn
5,864,609 A 1/1999 Cross et al.
5,864,828 A 1/1999 Atkins
5,864,830 A * 1/1999 Armetta et al. ............... 705/41
RE36,116 E 2/1999 McCarthy
5,870,718 A 2/1999 Spector
5,870,721 A 2/1999 Norris
5,875,437 A 2/1999 Atkins
5,883,377 A 3/1999 Chapin, Jr.
5,883,810 A 3/1999 Franklin et al.
5,884,271 A 3/1999 Pitroda
5,884,278 A 3/1999 Powell
5,884,285 A 3/1999 Atkins
5,887,065 A 3/1999 Audebert
5,890,138 A 3/1999 Godin et al.
5,890,140 A 3/1999 Clark et al.
H1794 H 4/1999 Claus
5,897,620 A 4/1999 Walker et al.
5,897,621 A 4/1999 Boesch et al.
5,901,303 A * 5/1999 Chew ......................... 711/115
5,905,246 A 5/1999 Fajkowski
5,907,350 A 5/1999 Nemirofsky
5,911,135 A 6/1999 Atkins
5,911,136 A 6/1999 Atkins
5,914,472 A 6/1999 Foladare et al.
5,920,629 A 7/1999 Rosen
5,920,844 A 7/1999 Hotta et al.
5,920,847 A 7/1999 Kolling et al.
5,923,734 A 7/1999 Taskett
5,926,800 A 7/1999 Baronowski et al.
5,930,217 A 7/1999 Kayanuma
5,931,764 A 8/1999 Freeman et al.
5,933,817 A 8/1999 Hucal
5,936,221 A 8/1999 Corder et al.
5,937,068 A 8/1999 Audebert
5,940,811 A 8/1999 Norris
5,946,669 A 8/1999 Polk
5,952,641 A 9/1999 Korshun
5,953,423 A 9/1999 Rosen
5,953,710 A 9/1999 Fleming
5,955,961 A 9/1999 Wallerstein
5,956,695 A 9/1999 Carrithers et al.
5,963,648 A 10/1999 Rosen
5,970,479 A 10/1999 Shepherd
5,970,480 A 10/1999 Kalina
5,974,399 A 10/1999 Giuliani et al.
RE36,365 E 11/1999 Levine et al.
5,984,180 A 11/1999 Albrecht
5,984,191 A 11/1999 Chapin, Jr.
5,987,434 A 11/1999 Libman
5,988,509 A 11/1999 Taskett
5,991,413 A 11/1999 Arditti et al.
5,991,743 A 11/1999 Irving et al.
5,991,748 A 11/1999 Taskett
5,991,750 A 11/1999 Watson
5,999,596 A 12/1999 Walker et al.
6,000,608 A 12/1999 Dorf
6,000,832 A 12/1999 Franklin et al.
6,002,383 A 12/1999 Shimada
6,003,762 A 12/1999 Hayashida
6,004,681 A 12/1999 Epstein et al.
6,006,988 A 12/1999 Behrmann et al.
6,009,415 A 12/1999 Shurling et al.
6,014,636 A 1/2000 Reeder
6,014,638 A 1/2000 Burge et al.
6,014,645 A 1/2000 Cunningham
6,014,749 A 1/2000 Gloor et al.
6,016,482 A 1/2000 Molinari et al.
6,016,954 A 1/2000 Abe et al.
6,019,284 A 2/2000 Freeman et al.
6,021,189 A 2/2000 Vu
6,026,370 A 2/2000 Jermyn

| | | | |
|---|---|---|---|
| 6,029,139 | A | 2/2000 | Cunningham et al. |
| 6,029,144 | A | 2/2000 | Barrett et al. |
| 6,029,890 | A | 2/2000 | Austin |
| 6,032,136 | A | 2/2000 | Brake, Jr. et al. |
| 6,032,859 | A | 3/2000 | Muehlberger et al. |
| 6,036,099 | A | 3/2000 | Leighton |
| 6,038,292 | A | 3/2000 | Thomas |
| 6,038,552 | A | 3/2000 | Fleischl et al. |
| 6,041,315 | A | 3/2000 | Pollin |
| 6,044,360 | A | 3/2000 | Picciallo |
| 6,045,042 | A | 4/2000 | Ohno |
| 6,045,050 | A | 4/2000 | Ippolito et al. |
| 6,047,067 | A | 4/2000 | Rosen |
| 6,047,268 | A | 4/2000 | Bartoli et al. |
| 6,049,463 | A | 4/2000 | O'Malley et al. |
| 6,049,773 | A | 4/2000 | McCormack et al. |
| 6,049,782 | A | 4/2000 | Gottesman et al. |
| 6,058,378 | A | 5/2000 | Clark et al. |
| 6,064,985 | A | 5/2000 | Anderson |
| 6,065,675 | A | 5/2000 | Teicher |
| 6,068,183 | A | 5/2000 | Freeman et al. |
| 6,070,067 | A | 5/2000 | Nguyen et al. |
| 6,070,147 | A | 5/2000 | Harms et al. |
| 6,070,153 | A | 5/2000 | Simpson |
| 6,076,068 | A | 6/2000 | DeLapa et al. |
| 6,076,072 | A | 6/2000 | Libman |
| 6,078,888 | A | 6/2000 | Johnson, Jr. |
| 6,078,891 | A | 6/2000 | Riordan et al. |
| 6,091,817 | A | 7/2000 | Bertina et al. |
| 6,092,056 | A | 7/2000 | Tull, Jr. et al. |
| 6,095,412 | A | 8/2000 | Bertina et al. |
| 6,095,416 | A | 8/2000 | Grant et al. |
| 6,098,053 | A | 8/2000 | Slater |
| 6,105,008 | A | 8/2000 | Davis et al. |
| 6,105,009 | A | 8/2000 | Cuervo |
| 6,105,011 | A | 8/2000 | Morrison, Jr. |
| 6,105,865 | A | 8/2000 | Hardesty |
| 6,109,525 | A | 8/2000 | Blomqvist et al. |
| 6,112,191 | A | 8/2000 | Burke |
| 6,115,458 | A | 9/2000 | Taskett |
| 6,119,097 | A | 9/2000 | Ibarra |
| 6,119,103 | A | 9/2000 | Basch et al. |
| 6,119,107 | A | 9/2000 | Polk |
| 6,119,932 | A | 9/2000 | Maloney et al. |
| 6,122,623 | A | 9/2000 | Garman |
| 6,128,598 | A | 10/2000 | Walker et al. |
| 6,128,599 | A | 10/2000 | Walker et al. |
| 6,129,274 | A | 10/2000 | Suzuki |
| 6,129,572 | A | 10/2000 | Feldman et al. |
| 6,134,309 | A | 10/2000 | Carson |
| 6,134,536 | A | 10/2000 | Shepherd |
| 6,138,917 | A | 10/2000 | Chapin, Jr. |
| 6,145,741 | A | 11/2000 | Wisdom et al. |
| 6,148,297 | A | 11/2000 | Swor et al. |
| 6,161,096 | A | 12/2000 | Bell |
| 6,163,770 | A | 12/2000 | Gamble et al. |
| 6,164,533 | A | 12/2000 | Barton |
| 6,167,385 | A | 12/2000 | Hartley-Urquhart |
| 6,169,975 | B1 | 1/2001 | White et al. |
| 6,173,267 | B1 | 1/2001 | Cairns |
| 6,179,211 | B1 | 1/2001 | Green et al. |
| 6,182,048 | B1 | 1/2001 | Osborn et al. |
| 6,182,894 | B1 | 2/2001 | Hackett et al. |
| 6,186,793 | B1 | 2/2001 | Brubaker |
| 6,189,787 | B1 | 2/2001 | Dorf |
| 6,192,113 | B1 | 2/2001 | Lorsch |
| 6,192,142 | B1 | 2/2001 | Pare, Jr. et al. |
| 6,195,644 | B1 | 2/2001 | Bowie |
| 6,202,053 | B1 | 3/2001 | Christiansen et al. |
| RE37,122 | E | 4/2001 | Levine et al. |
| 6,213,392 | B1 | 4/2001 | Zuppichich |
| 6,223,143 | B1 | 4/2001 | Weinstock et al. |
| 6,227,445 | B1 | 5/2001 | Brookner |
| 6,227,447 | B1 | 5/2001 | Campisano |
| 6,227,972 | B1 | 5/2001 | Walker et al. |
| 6,243,688 | B1 | 6/2001 | Kalina |
| 6,260,758 | B1 | 7/2001 | Blumberg |
| 6,263,316 | B1 | 7/2001 | Khan et al. |
| 6,265,977 | B1 | 7/2001 | Vega et al. |
| 6,278,981 | B1 | 8/2001 | Dembo et al. |
| 6,282,522 | B1 | 8/2001 | Davis et al. |
| 6,295,344 | B1 | 9/2001 | Marshall |
| 6,295,522 | B1 | 9/2001 | Boesch |
| 6,298,336 | B1 | 10/2001 | Davis et al. |
| 6,308,268 | B1 | 10/2001 | Audebert |
| 6,315,195 | B1 | 11/2001 | Ramachandran |
| 6,324,524 | B1 | 11/2001 | Lent et al. |
| 6,330,546 | B1 | 12/2001 | Gopinathan et al. |
| 6,336,099 | B1 | 1/2002 | Barnett et al. |
| 6,338,048 | B1 | 1/2002 | Mori |
| 6,341,724 | B2 | 1/2002 | Campisano |
| 6,343,743 | B1 | 2/2002 | Lamla |
| 6,345,261 | B1 | 2/2002 | Feidelson |
| 6,345,766 | B1 | 2/2002 | Taskett et al. |
| 6,349,291 | B1 | 2/2002 | Varma |
| 6,360,954 | B1 | 3/2002 | Barnardo |
| 6,366,220 | B1 | 4/2002 | Elliott |
| 6,366,967 | B1 | 4/2002 | Wagner |
| 6,373,969 | B1 | 4/2002 | Adler |
| 6,374,230 | B1 | 4/2002 | Walker et al. |
| 6,377,669 | B1 | 4/2002 | Walker et al. |
| 6,385,591 | B1 | 5/2002 | Mankoff |
| 6,385,594 | B1 | 5/2002 | Lebda et al. |
| 6,386,444 | B1 | 5/2002 | Sullivan |
| 6,397,202 | B1 | 5/2002 | Higgins et al. |
| 6,402,039 | B1 | 6/2002 | Freeman et al. |
| 6,405,182 | B1 | 6/2002 | Cuervo |
| 6,419,161 | B1 | 7/2002 | Haddad et al. |
| 6,422,459 | B1 | 7/2002 | Kawan |
| 6,422,462 | B1 | 7/2002 | Cohen |
| 6,424,029 | B1 | 7/2002 | Giesler |
| 6,429,927 | B1 | 8/2002 | Borza |
| 6,434,259 | B1 | 8/2002 | Hamid et al. |
| D462,477 | S | 9/2002 | Osborne |
| 6,446,210 | B1 | 9/2002 | Borza |
| 6,450,407 | B1 | 9/2002 | Freeman et al. |
| 6,463,039 | B1 | 10/2002 | Ricci et al. |
| 6,467,684 | B2 | 10/2002 | Fite et al. |
| 6,473,500 | B1 | 10/2002 | Risafi et al. |
| 6,481,125 | B1 | 11/2002 | Pokrasoff |
| 6,484,144 | B2 | 11/2002 | Martin et al. |
| 6,484,148 | B1 | 11/2002 | Boyd |
| 6,484,428 | B1 | 11/2002 | Greenwald et al. |
| D466,929 | S | 12/2002 | Haas |
| D467,271 | S | 12/2002 | Haas |
| D467,272 | S | 12/2002 | Haas |
| 6,488,206 | B1 | 12/2002 | Flaig et al. |
| 6,498,861 | B1 | 12/2002 | Hamid et al. |
| D468,789 | S | 1/2003 | Arnold et al. |
| 6,505,095 | B1 | 1/2003 | Kolls |
| 6,505,168 | B1 | 1/2003 | Rothman et al. |
| 6,505,780 | B1 | 1/2003 | Yassin et al. |
| 6,507,644 | B1 | 1/2003 | Henderson et al. |
| 6,529,880 | B1 | 3/2003 | McKeen et al. |
| D474,235 | S | 5/2003 | Haas |
| 6,557,750 | B1 | 5/2003 | Druse et al. |
| 6,557,766 | B1 | 5/2003 | Leighton |
| 6,558,255 | B2 | 5/2003 | Walker et al. |
| 6,560,578 | B2 | 5/2003 | Eldering |
| 6,561,657 | B1 | 5/2003 | Schofield |
| 6,567,786 | B1 | 5/2003 | Bibelnieks et al. |
| 6,567,821 | B1 | 5/2003 | Polk |
| 6,574,603 | B1 | 6/2003 | Dickson et al. |
| 6,575,361 | B1 | 6/2003 | Graves et al. |
| 6,581,839 | B1 | 6/2003 | Lasch et al. |
| D476,681 | S | 7/2003 | Al Amri |

D477,359 S 7/2003 Haas
6,592,044 B1 7/2003 Wong et al.
6,601,040 B1 7/2003 Kolls
6,601,761 B1 8/2003 Katis
6,609,111 B1 8/2003 Bell
6,609,113 B1 8/2003 O'Leary et al.
6,609,654 B1 8/2003 Anderson et al.
6,609,658 B1 8/2003 Sehr
RE38,255 E 9/2003 Levine et al.
6,615,189 B1 9/2003 Phillips et al.
6,615,190 B1 9/2003 Slater
6,625,582 B2 9/2003 Richman et al.
6,631,849 B2 10/2003 Blossom
6,641,049 B2 11/2003 Luu
6,641,050 B2 11/2003 Kelley et al.
6,659,259 B2 12/2003 Knox et al.
6,671,673 B1 12/2003 Baseman et al.
D485,573 S 1/2004 Li
6,675,127 B2 1/2004 LaBlanc et al.
6,675,149 B1 1/2004 Ruffin et al.
6,693,544 B1 2/2004 Hebbecker
6,732,919 B2 5/2004 Macklin et al.
6,742,704 B2 6/2004 Fitzmaurice et al.
6,745,938 B2 6/2004 Sullivan
6,757,660 B2 6/2004 Canada et al.
6,757,710 B2 6/2004 Reed
D495,736 S 9/2004 Scharf
6,793,135 B1 9/2004 Ryoo
6,802,008 B1 10/2004 Ikefuji et al.
6,805,287 B2 10/2004 Bishop
6,805,288 B2 10/2004 Routhenstein et al.
6,856,973 B1 2/2005 Bott
6,865,547 B1 3/2005 Brake, Jr. et al.
6,868,426 B1 3/2005 Mankoff
6,876,971 B1 4/2005 Burke
D505,450 S 5/2005 Lauer et al.
6,892,187 B2 5/2005 Phillips et al.
6,895,383 B2 5/2005 Heinrich
6,895,386 B1 5/2005 Bachman et al.
6,901,372 B1 5/2005 Helzerman
6,912,502 B1 6/2005 Buddle et al.
6,970,830 B1 11/2005 Samra et al.
6,978,369 B2 12/2005 Wheeler et al.
6,999,943 B1 2/2006 Johnson et al.
7,006,992 B1 2/2006 Packwood
7,051,925 B2 5/2006 Schwarz, Jr.
7,072,864 B2 7/2006 Brake, Jr. et al.
7,072,909 B2 7/2006 Polk
7,086,586 B1 8/2006 Sullivan
7,089,503 B1 8/2006 Bloomquist et al.
7,092,905 B2 8/2006 Behrenbrinker et al.
7,092,916 B2 8/2006 Diveley
7,104,443 B1 9/2006 Paul et al.
7,107,249 B2 9/2006 Dively
7,113,914 B1 9/2006 Spielmann et al.
7,130,828 B2 10/2006 Phillips et al.
D533,220 S 12/2006 Graves et al.
7,163,153 B2 1/2007 Blossom
7,165,049 B2 1/2007 Slater
7,171,388 B2 1/2007 Phillips et al.
7,174,314 B2 2/2007 Phillips et al.
7,174,315 B2 2/2007 Phillips et al.
7,174,316 B2 2/2007 Phillips et al.
7,174,317 B2 2/2007 Phillips et al.
7,177,838 B1 2/2007 Ling
D538,349 S 3/2007 Hollands
7,191,952 B2 3/2007 Blossom
7,195,154 B2 3/2007 Routhenstein et al.
7,216,091 B1 5/2007 Blandina et al.
7,225,155 B1 5/2007 Polk
7,243,839 B2 7/2007 Beck et al.
7,249,092 B2 7/2007 Dunn et al.
7,249,099 B2 7/2007 Ling
7,252,223 B2 8/2007 Schofield
7,263,507 B1 8/2007 Brake, Jr.
D551,705 S 9/2007 Mershon
7,295,999 B1 11/2007 Simon et al.
7,313,546 B2 12/2007 Alarcon-Luther
7,315,843 B2 1/2008 Diveley et al.
7,328,181 B2 2/2008 Sutton et al.
7,328,189 B2 2/2008 Ling
7,346,567 B2 3/2008 Weeks
7,357,331 B2 4/2008 Blossom
7,363,273 B2 4/2008 Phillips et al.
7,376,621 B1 5/2008 Ling
7,392,222 B1 6/2008 Hamilton et al.
7,392,224 B1 6/2008 Bauer et al.
2001/0001856 A1 5/2001 Gould et al.
2001/0011227 A1 8/2001 Ashery et al.
2001/0011243 A1 8/2001 Dembo et al.
2001/0027389 A1 10/2001 Beverina et al.
2001/0027441 A1 10/2001 Wankmueller
2001/0034647 A1 10/2001 Marks et al.
2001/0034682 A1 10/2001 Knight et al.
2001/0037315 A1 11/2001 Saliba et al.
2001/0044293 A1 11/2001 Morgan
2001/0044733 A1 11/2001 Lee et al.
2001/0047332 A1 11/2001 Gonen-Friedman et al.
2001/0047342 A1 11/2001 Cuervo
2001/0054003 A1 12/2001 Chien et al.
2001/0056398 A1 12/2001 Scheirer
2002/0019793 A1 2/2002 Frattalone
2002/0019803 A1 2/2002 Muller
2002/0026418 A1 2/2002 Koppel et al.
2002/0032609 A1 3/2002 Wilkman
2002/0046089 A1 4/2002 Zorn
2002/0046255 A1 4/2002 Moore et al.
2002/0062235 A1 5/2002 Wahlbin et al.
2002/0065712 A1* 5/2002 Kawan ........................ 705/14
2002/0065720 A1 5/2002 Carswell et al.
2002/0073030 A1 6/2002 Offer
2002/0077964 A1 6/2002 Brody et al.
2002/0077978 A1 6/2002 O'Leary et al.
2002/0082990 A1 6/2002 Jones
2002/0091572 A1 7/2002 Anderson et al.
2002/0091631 A1 7/2002 Usui
2002/0091632 A1 7/2002 Turock et al.
2002/0091649 A1 7/2002 Anvekar et al.
2002/0095365 A1 7/2002 Slavin et al.
2002/0099586 A1 7/2002 Bladen et al.
2002/0099667 A1 7/2002 Diamandis et al.
2002/0104878 A1 8/2002 Seifert et al.
2002/0111916 A1 8/2002 Coronna et al.
2002/0116271 A1 8/2002 Mankoff
2002/0116330 A1 8/2002 Hed et al.
2002/0117541 A1 8/2002 Biggar et al.
2002/0120627 A1 8/2002 Mankoff
2002/0120642 A1 8/2002 Fetherston
2002/0129221 A1 9/2002 Borgin et al.
2002/0138418 A1 9/2002 Zarin et al.
2002/0139843 A1 10/2002 Park et al.
2002/0143703 A1 10/2002 Razvan et al.
2002/0147662 A1 10/2002 Anderson
2002/0147683 A1 10/2002 Capobianco et al.
2002/0152168 A1 10/2002 Neofytides et al.
2002/0156723 A1 10/2002 Lilly et al.
2002/0161702 A1 10/2002 Milberger et al.
2002/0165771 A1 11/2002 Walker et al.
2002/0165820 A1 11/2002 Anvekar et al.
2002/0169719 A1 11/2002 Dively et al.
2002/0174016 A1 11/2002 Cuervo
2002/0174018 A1 11/2002 Bunger et al.
2002/0178025 A1 11/2002 Hansen et al.
2002/0178063 A1 11/2002 Gravelle et al.
2002/0190123 A1 12/2002 Anvekar et al.
2002/0194081 A1 12/2002 Perkowski

| | | | |
|---|---|---|---|
| 2002/0194124 | A1 | 12/2002 | Hobbs et al. |
| 2003/0001005 | A1 | 1/2003 | Risafi et al. |
| 2003/0004828 | A1 | 1/2003 | Epstein |
| 2003/0018613 | A1 | 1/2003 | Oytac |
| 2003/0023549 | A1 | 1/2003 | Armes et al. |
| 2003/0028518 | A1 | 2/2003 | Mankoff |
| 2003/0031321 | A1 | 2/2003 | Mages |
| 2003/0033211 | A1 | 2/2003 | Haines et al. |
| 2003/0033246 | A1 | 2/2003 | Slater |
| 2003/0034388 | A1 | 2/2003 | Routhenstein et al. |
| 2003/0046249 | A1 | 3/2003 | Wu |
| 2003/0053609 | A1 | 3/2003 | Risafi et al. |
| 2003/0055780 | A1 | 3/2003 | Hansen et al. |
| 2003/0061168 | A1 | 3/2003 | Routhenstein et al. |
| 2003/0065624 | A1 | 4/2003 | James et al. |
| 2003/0074290 | A1 | 4/2003 | Clore |
| 2003/0085272 | A1 | 5/2003 | Andrews et al. |
| 2003/0101119 | A1 | 5/2003 | Parsons et al. |
| 2003/0105672 | A1 | 6/2003 | Epstein et al. |
| 2003/0105714 | A1 | 6/2003 | Alarcon-Luther |
| 2003/0110111 | A1 | 6/2003 | Nalebuff et al. |
| 2003/0130940 | A1 | 7/2003 | Hansen et al. |
| 2003/0130948 | A1 | 7/2003 | Algiene et al. |
| 2003/0135459 | A1 | 7/2003 | Abelman et al. |
| 2003/0135462 | A1 | 7/2003 | Brake, Jr. et al. |
| 2003/0140004 | A1 | 7/2003 | O'Leary et al. |
| 2003/0144935 | A1 | 7/2003 | Sobek |
| 2003/0149660 | A1 | 8/2003 | Canfield |
| 2003/0154125 | A1 | 8/2003 | Mittal et al. |
| 2003/0154163 | A1 | 8/2003 | Phillips et al. |
| 2003/0163403 | A1 | 8/2003 | Chen et al. |
| 2003/0163416 | A1 | 8/2003 | Kitajima |
| 2003/0172040 | A1 | 9/2003 | Kemper et al. |
| 2003/0195808 | A1 | 10/2003 | Brown et al. |
| 2003/0195842 | A1 | 10/2003 | Reece |
| 2003/0200143 | A9 | 10/2003 | Walker et al. |
| 2003/0200179 | A1 | 10/2003 | Kwan |
| 2003/0200180 | A1 | 10/2003 | Phelan et al. |
| 2003/0204421 | A1 | 10/2003 | Houle et al. |
| 2003/0205616 | A1 | 11/2003 | Graves et al. |
| 2003/0216965 | A1 | 11/2003 | Libman |
| 2003/0218062 | A1 | 11/2003 | Noriega et al. |
| 2003/0222136 | A1 | 12/2003 | Bolle et al. |
| 2003/0225623 | A1 | 12/2003 | Wankmueller |
| 2003/0229525 | A1 | 12/2003 | Callahan et al. |
| 2003/0236704 | A1 | 12/2003 | Antonucci |
| 2004/0007618 | A1 | 1/2004 | Oram et al. |
| 2004/0024672 | A1 | 2/2004 | Brake, Jr. et al. |
| 2004/0030626 | A1 | 2/2004 | Libman |
| 2004/0039588 | A1 | 2/2004 | Libman |
| 2004/0059952 | A1 | 3/2004 | Newport et al. |
| 2004/0064332 | A1 | 4/2004 | Zou et al. |
| 2004/0064402 | A1 | 4/2004 | Dreyer et al. |
| 2004/0093296 | A1 | 5/2004 | Phelan et al. |
| 2004/0093303 | A1 | 5/2004 | Picciallo |
| 2004/0098351 | A1 | 5/2004 | Duke |
| 2004/0103431 | A1 | 5/2004 | Davenport et al. |
| 2004/0118914 | A1 | 6/2004 | Smith et al. |
| 2004/0128186 | A1 | 7/2004 | Breslin et al. |
| 2004/0193539 | A1 | 9/2004 | Sullivan |
| 2004/0210498 | A1 | 10/2004 | Freund |
| 2004/0215507 | A1 | 10/2004 | Levitt et al. |
| 2004/0243498 | A1 | 12/2004 | Duke |
| 2005/0021353 | A1 | 1/2005 | Aviles et al. |
| 2005/0021400 | A1 | 1/2005 | Postrel |
| 2005/0021457 | A1 | 1/2005 | Johnson et al. |
| 2005/0027649 | A1 | 2/2005 | Cech |
| 2005/0035192 | A1 | 2/2005 | Bonalle et al. |
| 2005/0049950 | A1 | 3/2005 | Johnson |
| 2005/0065877 | A1 | 3/2005 | Cleary et al. |
| 2005/0071230 | A1 | 3/2005 | Mankoff |
| 2005/0075932 | A1 | 4/2005 | Mankoff |
| 2005/0077350 | A1 | 4/2005 | Courtion et al. |
| 2005/0086160 | A1 | 4/2005 | Wong |
| 2005/0091138 | A1 | 4/2005 | Awatsu |
| 2005/0102228 | A1 | 5/2005 | Srinivasan et al. |
| 2005/0108152 | A1 | 5/2005 | Tsao Lee et al. |
| 2005/0119979 | A1 | 6/2005 | Murashita et al. |
| 2005/0127168 | A1 | 6/2005 | Phillips et al. |
| 2005/0171898 | A1 | 8/2005 | Bishop et al. |
| 2005/0199705 | A1 | 9/2005 | Beck et al. |
| 2005/0234771 | A1 | 10/2005 | Register et al. |
| 2005/0269396 | A1 | 12/2005 | Schofield |
| 2006/0026092 | A1 | 2/2006 | Klein et al. |
| 2006/0036553 | A1 | 2/2006 | Gupta et al. |
| 2006/0047573 | A1 | 3/2006 | Mitchell et al. |
| 2006/0047589 | A1 | 3/2006 | Grau |
| 2006/0074794 | A1 | 4/2006 | Nespola, Jr. |
| 2006/0085334 | A1 | 4/2006 | Murphy |
| 2006/0106696 | A1 | 5/2006 | Carlson |
| 2006/0116903 | A1 | 6/2006 | Becerra |
| 2006/0122918 | A1 | 6/2006 | Graboske et al. |
| 2006/0131869 | A1 | 6/2006 | Brignull |
| 2006/0157557 | A1 | 7/2006 | Lee et al. |
| 2006/0224480 | A1 | 10/2006 | Bent et al. |
| 2006/0242057 | A1 | 10/2006 | Velarde |
| 2006/0251478 | A1 | 11/2006 | Desmeules |
| 2006/0289636 | A1 | 12/2006 | Hoblit |
| 2007/0034700 | A1 | 2/2007 | Poidomani et al. |
| 2007/0113451 | A1 | 5/2007 | McDowell et al. |
| 2007/0118436 | A1 | 5/2007 | McDowell et al. |
| 2007/0215688 | A1 | 9/2007 | Routhenstein et al. |
| 2007/0226141 | A1 | 9/2007 | Phillips et al. |
| 2008/0021825 | A1 | 1/2008 | Phillips et al. |
| 2008/0029607 | A1 | 2/2008 | Mullen |
| 2008/0035738 | A1 | 2/2008 | Mullen |
| 2008/0054068 | A1 | 3/2008 | Mullen |
| 2008/0054079 | A1 | 3/2008 | Mullen |
| 2008/0054081 | A1 | 3/2008 | Mullen |
| 2008/0059373 | A1 | 3/2008 | Phillips et al. |
| 2008/0065555 | A1 | 3/2008 | Mullen |
| 2008/0177659 | A1 | 7/2008 | Lacey et al. |
| 2008/0230600 | A1 | 9/2008 | Black et al. |
| 2008/0302869 | A1 | 12/2008 | Mullen |
| 2008/0302876 | A1 | 12/2008 | Mullen |

FOREIGN PATENT DOCUMENTS

| | | | |
|---|---|---|---|
| EP | 0843292 | A2 | 5/1998 |
| EP | 0855659 | | 7/1998 |
| EP | 959440 | | 11/1999 |
| GB | 2275654 | A | 9/1994 |
| GB | 2376787 | | 12/2002 |
| GB | 2377071 | | 12/2002 |
| GB | 2377314 | | 1/2003 |
| WO | WO 94/29112 | | 12/1994 |
| WO | WO 97/41673 | | 11/1997 |
| WO | WO 98/59307 | | 12/1998 |
| WO | WO 99/05633 | | 2/1999 |
| WO | WO 99-54841 | | 10/1999 |
| WO | WO 01/18699 | | 3/2001 |
| WO | WO/01/59654 | | 8/2001 |
| WO | WO 01/69347 | | 9/2001 |
| WO | WO 01/69347 | A2 | 9/2001 |
| WO | WO 01/69347 | A3 | 9/2001 |
| WO | WO 01-88659 | | 11/2001 |
| WO | WO 2005/043277 | A3 | 5/2005 |
| WO | WO 2006-105092 | | 10/2006 |
| WO | WO 2006-116772 | | 11/2006 |

OTHER PUBLICATIONS

Claessens, et al., A Tangled World Wide Web of Security Issues, First Monday, retrieved from the internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards A Rewarding Experience (Off-line debit card issuers converge efforts with companies looking for effective incentives to boost employee productivity and to motivate individuals to buy their products), Debit Card News, vol.
Vincent Alonzo, Incentive Marketing . . . Three If By Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.

MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian-the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways For A better Total Return For Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans For Cross Border Visa Cash Based On CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Kenneth Hein, What's the Deal?, Incentive, Jul. 1998, 7 pages.
Machlis et al., Will smart cards replace ATMS?, Computerworld, printed Feb. 23, 2001, 3 pages.
Complaint for Declaratory Judgment and Patent Infringement; In the United States District Court for the District of Delaware; Civil Action No. 08-189; JPMorgan Chase & Co., et al. v. Affiliated Computer Services, Inc., et al.; 33 pages.
Hamey, Kenneth, Home Asset Management Accounts Link Mortgages Equity Lines.
Rossman, Kenneth, Summary Appraisal of Real Property.
Wells Fargo Blazes New Trail for Homeowners.
First Amended Answer and Counterclaims to JP Morgan Chase's First Amended and Supplemental Complaint for Declaratory Judgment and Patent Infringement dated Dec. 10, 2008.
Unknown, Debit Card News: "Paperless Trail Leads Debit to a Check-Free Payroll Program", vol. 3, No. 12, Dec. 16, 1997.
Alaska Housing Finance Corporation Quarterly Unaudited Financial Statements with Summarized Financial Information for Jun. 30, 2004, and Request for Information Banking Services, Mar. 31, 2005, Bates Nos. ACS-00000143-ACS-00000231.
Answer and Counterclaims to JP Morgan Chase's Second Amended and Supplemental Complaint for Declaratory Judgment and Patent Infringement In the United States District Court for the District of Delaware, Civil Action No. 08-189-SLR, Public Version filed May 8, 2009.
Answer to ACS's Third Amended Counterclaims In the United States District Court for the District of Delaware, Civil Action No. 08-189-SLR, dated May 15, 2009.
Authorization of Financial Agent and Terms of Performance: Debit Card Application for Houston, Texas, Authorization of Financial Agent and Terms of Performance, executed on Sep. 26, 1991, Bates Nos. ACSTRES0000003-ACSTRES0000012.
Bowen, C. "Welfare Agencies Seek Aid From Smart Cards", Card Technology, vol. 7, No. 11, pp. 74-76, Oct. 2002.
Brian Claire's Letter in Response to the Debit Card Services Invitation enclosing Best and Final Pricing for Citibank's T-DCS, dated Sep. 13, 1991, Bates Nos. ACSTRES0000047-ACSTRES0000072.

CardTrack Online: Coca-Cola ATM Money Cards, Retrieved from the Internet at http://www.cardweb.com/cardtrak/news/cf4_4a_97.html, Article dated Apr. 7, 1997.
Electronic Benefit Transfer: Debit Card Services, Invitation for Expressions of Interest, Jul. 24, 1991, Bates Bates Nos. ACSTRES0000013-ACSTRES0000046.
FOIA #09-02-12 Responsive Records Book #11 containing Exhibit A, Technical Response, vol. One, Book VII to the Financial Agency Agreement of Jan. 24, 1996, Bates Nos. ACSTRES0002306-ACSTRES0002382.
FOIA #09-02-12 Responsive Records Book #2 containing Financial Agency Agreement of Jan. 24, 1996, dated Mar. 12, 2009, Bates Nos. ACSTRES0000106-ACSTRES0000121.
FOIA #09-02-12 Responsive Records Book #3 containing The Invitation for Expressions of Interest to Acquire EBT Services for the Southern Alliance of States, vol. I, Mar. 12, 2009, Bates Nos. ACSTRES0000122-ACSTRES0000440.
FOIA #09-02-12 Responsive Records Book #5 containing Exhibit A, Technical Response, vol. One, Book I, to the Financial Agency Agreement of Jan. 24, 1996, Mar. 12, 2009, Bates Nos. ACSTRES0000820-ACSTRES0001234.
FOIA #09-02-12 Responsive Records Book #7 containing Exhibit A, Technical Response, vol. One, Book III, to the Financial Agency Agreement of Jan. 24, 1996, dated Mar. 12, 2009, Bates Nos. ACSTRES0001345-ACSTRES0001371.
Hargreaves, The Evaluation of the Expanded EBT Demonstration in Maryland, vol. 1: System Startup, Conversion and Expansion—Final Report, May 1994.
Modification #1 to the Authorization of Financial Agent and Terms of Performance, Sep. 30, 1993, Bates Nos. ACSTRES0000073-ACSTRES0000080.
Modification #2 to the Authorization of Financial Agent and Terms of Performance, Mar. 25, 1994, Bates Nos. ACSTRES0000081-ACSTRES0000090.
Modification #3 to the Authorization of Financial Agent and Terms of Performance, dated Feb. 24, 1995, Bates Nos. ACSTRES0000091-ACSTRES0000097.
Modification #4 to the Authorization of Financial Agent and Terms of Performance, dated Apr. 1, 1996, Bates Nos. ACSTRES0000098-ACSTRES0000105.
Report to the Congress on the Application of the Electronic Fund Transfer Act to Electronic Stored-Value Products from the Board of Governors of the Federal Reserve System, Mar. 1997, Bates Nos. ACS00098020-ACS00098032.
Second Amended and Supplemental Complaint for Declaratory Judgment and Patent Infringement In the United States District Court for the District of Delaware, Civil Action No. 08-189-SLR, filed Apr. 14, 2009.
Sessums, “Unbanked” Citizens Draw Government Attention, Community Investments, vol. 9, No. 4, (1997), Bates Nos. ACS00280762-ACS00280768.
Wenninger et al, The Electronic Purse, Current Issues in Economics and Finance, published by The Federal Reserve Bank of New York, vol. 1, No. 1, Apr. 1995, Bates Nos. ACS00098037-ACS00098042.
Wood and Smith, “Electronic Transfer of Government Benefits”, Federal Reserve Bulletin, vol. 77, No. 4, pp. 2003-2217, Apr. 1991.
Deposition of Kim Slater dated May 29, 2009 in the matter of JPMorgan Chase & Co. et al. v. Affiliated Computer Services, Inc. in the United States District Court for the District of Delaware, Civil Action No. 08-189-SLR—Redacted Version.
Statement of Brian Kibble-Smith, House Committee on Ways and Means, Apr. 5, 2006.
Cheney and Rhine, “How Effective Were the Financial Safety Nets in the Aftermath of Katrina,” Discussion Paper Payment Cards Center, Federal Reserve Bank of Philadelphia, Jan. 2006.
A Survey and White Paper of the EBT Industry Council, “Debit and Stored Value Cards for Government: A Growing Trend but States Could Do More,” EFTA, Nov. 2006.
“In Time of Need: A National Strategy for Disaster Relief Cards,” prepared by JPMorgan Chase Treasury Services—Public Sector, Jan. 26, 2007.
“In Time of Need: A National Strategy for Disaster Relief Cards,” Abstract, prepared by JPMorgan Chase Treasury Services—Public Sector, Jan. 26, 2007.
Request for Information submitted to Department of Health and Human Services by JPMorgan Electronic Financial Services, Request for Information for EBT Services, Aug. 10, 2006.
Commercial Card Products Credit Policy, dated effective Oct. 15, 2002, Bates Nos. JPMC-ACS-02060767-02060785—Redacted Version.
Bank One Commercial Card Services—Prepaid Card, Chart of Key Prepaid Card Competitors, Sep. 22, 2003, Bates Nos. JPMC-ACS-02060729-02060739—Redacted Version.
Bank One Commercial Card Services—Prepaid Card, Chart of Key Prepaid Payroll Card Competitors, Sep. 22, 2003, Bates Nos. JPMC-ACS-02060584—02060594—Redacted Version.
Pre Paid Gift Card—Growth, Review Document, Bank One, Mar. 16, 2004, Bates Nos. JPMC-ACS-02060790-02060812—Redacted Version.
“Prepaid Gift Cards,” The Nilson Report, Issue 680, Nov. 1998.
Stipulation of Partial Dismissal In the United States District Court for the District of Delaware, Civil Action No. 08-189-SLR, Nov. 17, 2009.
“On The Way,” CardFax Journal, LexisNexis Academic, Mar. 31, 1997.
“New Debit Card is Introduced to Serve ‘Unbanked’ Workers,” Gethan Ward, The Tennessean, Lexis, Jun. 23, 1999.
Emerging Electronic Methods for Making Retail Payments, A CBO Study, Congressional Budget Office, Jun. 1996.
CCS Times, vol. 2, No. 1, Jan./Feb. 1997.
CCS Time, vol. 2, No. 2, Mar./Apr. 1997.
Direct Payment Card, Final Report for the period Apr. 1, 1992 to Sep. 30, 1997, Department of the Treasury, Financial Management Service, Sep. 30, 1997.
Advisory Opinions, FDIC—93—35, Jun. 28, 1993.
DPC Argentina Pilot Evaluation, Data from May 1, 1995-Jan. 31, 1996, Citibank, Jul. 11, 1996.
Top Line Report, Direct Payment Card Focus Groups, Product Evaluation, Inc, Jul. 19, 1994.
Innovations in American Government, 1995 Awards Program Semi-finalist Application, EBT Direct Payment Card, Facsimile Transmittal, Department of the Treasury, Financial Management Service, May 8, 1995.
Paychex Access MasterMoney Card, Card issuance information, Oct. 24, 2000, Redacted Version.
SwiftGift Card, R. McKinley, CardTrak News, Nov. 24, 1998, available at: cardtrak.com/new/1998/11/24/swiftgift_card.
Final Office Action mailed Jun. 17, 2009 in co-pending U.S. Appl. No. 11/443,289.
Non-Final Office Action mailed Oct. 2, 2008 in co-pending U.S. Appl. No. 11/443,289.
Final Office Action mailed Feb. 20, 2008 in co-pending U.S. Appl. No. 11/443,289.
Non-Final Office Action mailed Jun. 11, 2007 in co-pending U.S. Appl. No. 11/443,289.
Final Office Action mailed Jun. 17, 2009 in co-pending U.S. Appl. No. 11/619,908.
Non-Final Office Action mailed Oct. 2, 2008 in co-pending U.S. Appl. No. 11/619,908.
Final Office Action mailed Jan. 31, 2008 in co-pending U.S. Appl. No. 11/619,908.
Non-Final Office Action mailed Jun. 7, 2007 in co-pending U.S. Appl. No. 11/619,908.
Final Office Action mailed Dec. 7, 2009 in co-pending U.S. Appl. No. 10/268,763.
Non-Final Office Action mailed Jan. 22, 2009 in co-pending U.S. Appl. No. 10/268,763.
Final Office Action mailed Apr. 28, 2008 in co-pending U.S. Appl. No. 10/268,763.
Non-Final Office Action mailed Jul. 19, 2007 in co-pending U.S. Appl. No. 10/268,763.

* cited by examiner

DEBIT PURCHASING OF STORED VALUE CARD FOR USE BY AND/OR DELIVERY TO OTHERS

RELATED APPLICATIONS

This patent application is a continuation of U.S. patent application Ser. No. 10/987,086, filed on Nov. 15, 2004, now U.S. Pat. No. 7,363,273, entitled "Debit Purchasing of Stored Value Card For Use By And/Or Delivery To Others", which is a continuation of U.S. patent application Ser. No. 10/441,067, filed on May 20, 2003, now U.S. Pat. No. 6,892,187, which is a continuation of U.S. patent application Ser. No. 09/102,044, filed Jun. 22, 1998, now U.S. Pat. No. 6,615,189. The disclosures of these priority applications are hereby incorporated herein by reference in their entirety.

The present application is also related to U.S. patent application Ser. No. 11/755,810, U.S. patent application Ser. No. 11/780,730, U.S. patent application Ser. No. 11/853,395, and U.S. patent application Ser. No. 11/930,518, all claiming benefit of U.S. patent application Ser. No. 10/987,086, filed on Nov. 15, 2004, now U.S. Pat. No. 7,363,273, which is a continuation of U.S. patent application Ser. No. 10/441,067, filed on May 20, 2003, now U.S. Pat. No. 6,892,187, which is a continuation of U.S. patent application Ser. No. 09/102,044, filed Jun. 22, 1998, now U.S. Pat. No. 6,615,189, all of which are entitled "Debit Purchasing of Stored value Card For Use By And/Or Delivery To Others", the entireties of which are incorporated by reference herein.

FIELD OF THE INVENTION

This invention relates to a system for purchasing or transferring of stored value or debit purchasing cards, which can be pre-arranged to be given as a gift to a designated recipient.

BACKGROUND OF THE INVENTION

On many occasions, consumers, other bank customers, credit card holders, and other persons find it is desirable to arrange for another person, perhaps a relative, to have access to a specified sum of money. For example, a parent might want to arrange for a child to have access to money when the child is taking a trip or going away to college. One may also find it desirable to mail a gift to another person who is geographically distant. In these and other cases, it is often undesirable to give away or send cash. If lost or stolen, cash is practically unrecoverable. Traveler's checks are also undesirable as they must be purchased at a bank and are not acceptable for many types of purchases. Gift certificates are also undesirable because they require the recipient to purchase from the merchant that issued the gift certificate. These and other drawbacks exist to the aforementioned alternatives.

SUMMARY OF THE INVENTION

An object of the invention is to overcome these and other drawbacks in existing purchase schemes.

Another object of the invention is to provide a method for issuing a purchase card comprising: presenting a purchaser with the opportunity to buy the purchase card, determining whether the purchaser has sufficient funds to pay for the purchase card, creating a purchase card account for a recipient designated by the purchaser; and issuing the purchase card.

A further object of the invention is to provide a purchase card where the recipient activates the purchase card.

A further object of the invention is to provide a purchase card where the purchase card account contains a monetary amount determined by the purchaser of the purchase card.

A further object of the invention is to provide a purchase card where money can be added to the balance of an issued purchase card account.

A further object of the invention is to provide a purchase card where the purchase card is activated when the issuer of the purchase card is notified that the recipient has received the purchase card.

A further object of the invention is to provide a purchase card where the issuer of the purchase card notifies the purchaser that the recipient has received the purchase card.

A further object of the invention is to provide a purchase card where the purchaser may designate with which merchants the purchase card may be used.

A further object of the invention is to provide a purchase card where the purchase card is activated for a predetermined period of time.

Another object is to provide a method for issuing a purchase card as a rebate award comprising: issuing a credit card to a cardholder, said credit card being associated with a sponsor. calculating a rebate amount based upon cardholder purchases made with said credit card, issuing a purchase card to a cardholder or to a recipient designated by said cardholder, said purchase card having a purchase value determined by said rebate amount.

A further object of the invention is to provide a purchase card where the recipient of the purchase card activates the card.

A further object of the invention is to provide a purchase card where the recipient activates the purchase card by notifying the issuer that the recipient has received the purchase card.

A further object of the invention is to provide a purchase card where the purchase card is activated for a predetermined period of time.

A further object of the invention is to provide a purchase card where the rebate is calculated based on all purchases made with the credit card.

A further object of the invention is to provide a purchase card where the rebate is calculated based on purchase from the sponsor made with the credit card.

A further object of the invention is to provide a purchase card where the sponsor notifies the issuer of the amount of rebate due a credit card holder, and the issuer creates a purchase card in that amount.

A further object of the invention is to provide a purchase card where the rebate is based on the monetary value of the purchases.

Another object of the present invention is to provide a method for converting a purchase card into a credit card comprising: creating a purchase card account for a recipient designated by the purchaser; issuing the purchase card; receiving a request from the recipient to convert the purchase card into a credit card; determining whether the recipient meets predetermined credit criteria to convert the purchase card into a credit card; creating a credit card account; and converting the purchase card into a credit card.

A further object of the invention is to provide a purchase card where the balance of the purchase card account is transferred to the credit card account.

A further object of the invention is to provide a purchase card where the credit cards is immediately activated upon being converted from a purchase card.

Other objects and advantages exist for the present invention.

DETAILED DESCRIPTION OF THE PREFERRED EMBODIMENTS

Figure 1:
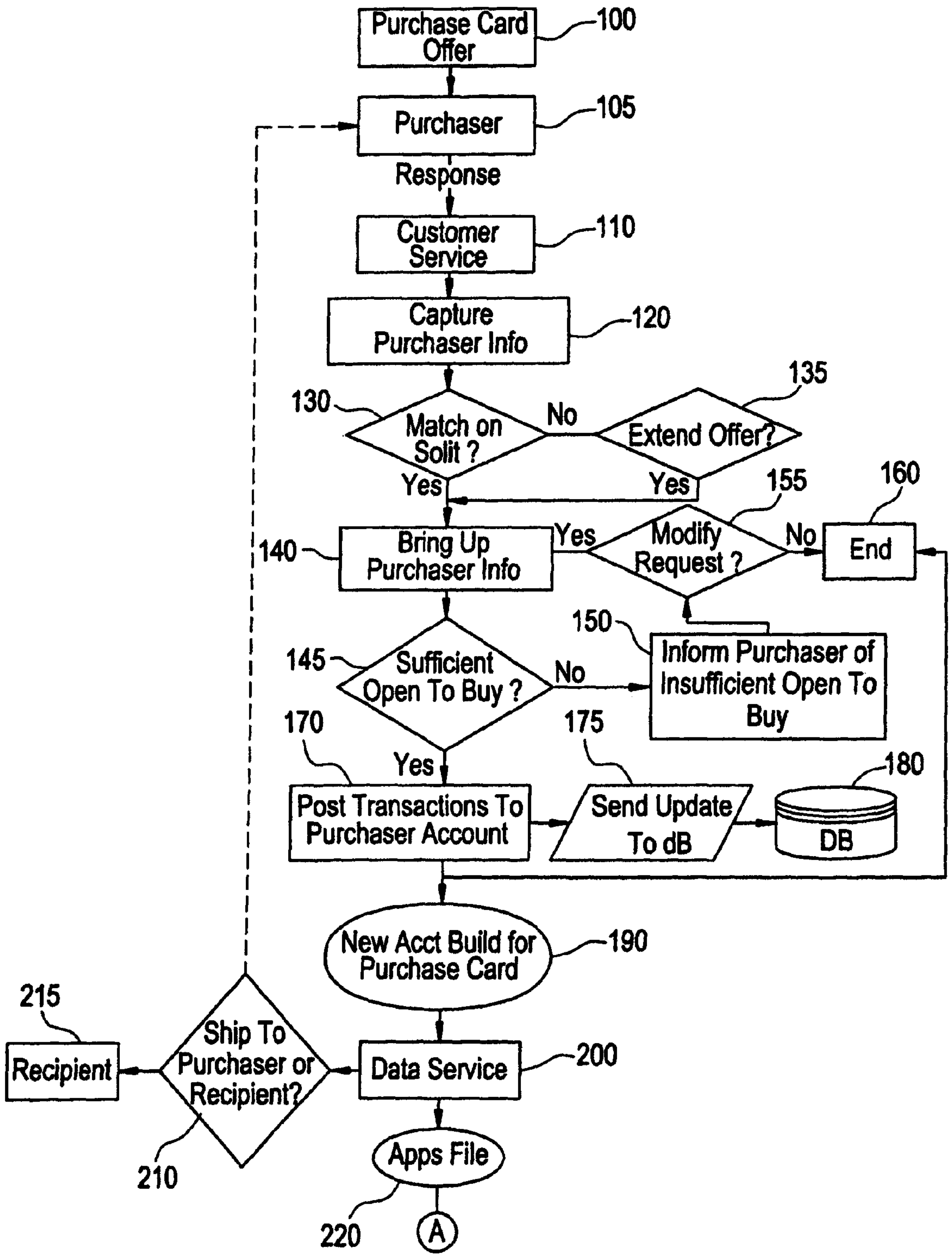
FIG. 1 shows a flow diagram for a portion of the purchase card system.

One embodiment of the purchase card system is shown in FIG. 1. In this embodiment the purchase card process begins with an offer to purchase a gift card at step 100. The offer may be in any suitable form that would notify prospective purchasers 105 of the availability of the purchase card. For example, a written solicitation may be mailed or otherwise distributed to potential purchasers 105. The offer may also be in the form of oral notification, for example, a telephone call to prospective purchasers 105. Alternatively, the offer may be published over a computer network, for example, on an Internet Web site. Other forms of offering the sale of a purchase card are also possible. In one embodiment of the invention, offers are made to prospective purchasers who already have a financial relationship with the offeror. Other potential purchasers may also be offered the opportunity to obtain a purchase card.

The offer may be accepted by a purchaser 105 by notifying a customer service center 110. The acceptance may be in any form acceptable to the customer service center 110. For example, the purchaser may mail, fax, or otherwise transmit a written acceptance, telephone an acceptance, or electronically transmit, for example, via Web Site, an acceptance by computer or other suitable device. At step 120, the customer service center 110 receives pertinent information to identify the purchaser 105 and the purchaser's desired spending limit for the purchase card. For example, the customer service center may identify the purchaser 105 by name, address, credit card account number, social security number, other unique identifiers or a combination of identifiers.

At step 130, the customer service center 120 is checked to verify that the caller or purchaser was included in the solicitations for this program. If the caller or purchaser was not originally solicited, customer service 120 determines whether to extend an offer in step 135.

If the caller or purchaser was solicited 130, certain purchaser 105 information may be accessed at 140. If, for example, the purchaser wishes to pay for the purchase card with a credit card, the purchaser's credit card account information may be accessed. For example, the purchaser's available credit limit may be accessed at 145 to verify that sufficient credit is available to cover the spending amount of the purchase card. If the available credit is insufficient, the purchaser 105 may be so informed at 150. The purchaser 105 may be given the opportunity to modify the purchase card spending amount, at 155, in order to ensure that the purchase amount does not exceed the available credit.

The process may terminate at 160 if, for example, the purchaser 105 does not wish to modify the purchase amount.

After it has been determined that the purchaser's available credit is sufficient, a transaction may be posted to the purchaser's credit card for the amount of the purchase at 170. In another embodiment of the present invention, a purchaser may use a check, cash, or other financial methods to obtain a purchase card. Regardless of the purchasing method, the issuer of the purchase card must determine whether the purchaser has sufficient funds to purchase the card.

When the purchase card is paid for by credit or bank account, the purchaser's account balance is updated at 175 to reflect the purchase. The account balance information, as well as information identifying the purchaser 105 and the recipient, may be stored in a retrievable and accessible fashion. For example, the information may be stored in computer database 180. After the purchaser 105 has paid (or authorized payment) for the purchase card, and it is posted to a credit card account, the acceptance process is complete and the acceptance process terminates at 160.

An account for the purchase card is created at 190. This may be performed by a third party processor that establishes and manages purchase card accounts. for example, at 200. Creation of the purchase card account may comprise various actions, such as, recording the recipients 215 name, address and phone number, imprinting a card with an account number, a recipient name and an expiration date, encoding the card to record the purchase value stored thereon, and other actions, such as, for example, preparing account fulfillment documents (e.g. card carrier activation, etc.).

When the purchase card account is complete, the card is delivered. In one embodiment of the invention, card may be affiliated with a particular network, such a credit network, or debit network. For example, a card may be affiliated with the VISA® network. The delivery may be to the purchaser 105 or to the recipient 215, as shown at 210. The place of delivery may be arranged during the initial purchase of the card or other suitable time before delivery.

Information regarding an account is sent to account file 220, where an account can be monitored. In one embodiment, account file 220 allows monitoring of the current balance of an account, any activity in the account, including debits and credits, transaction updates, and the like. Other information about an account, such as purchase dispute resolutions, the history provided by the customer, and account status, may also be monitored.

Figure 2:
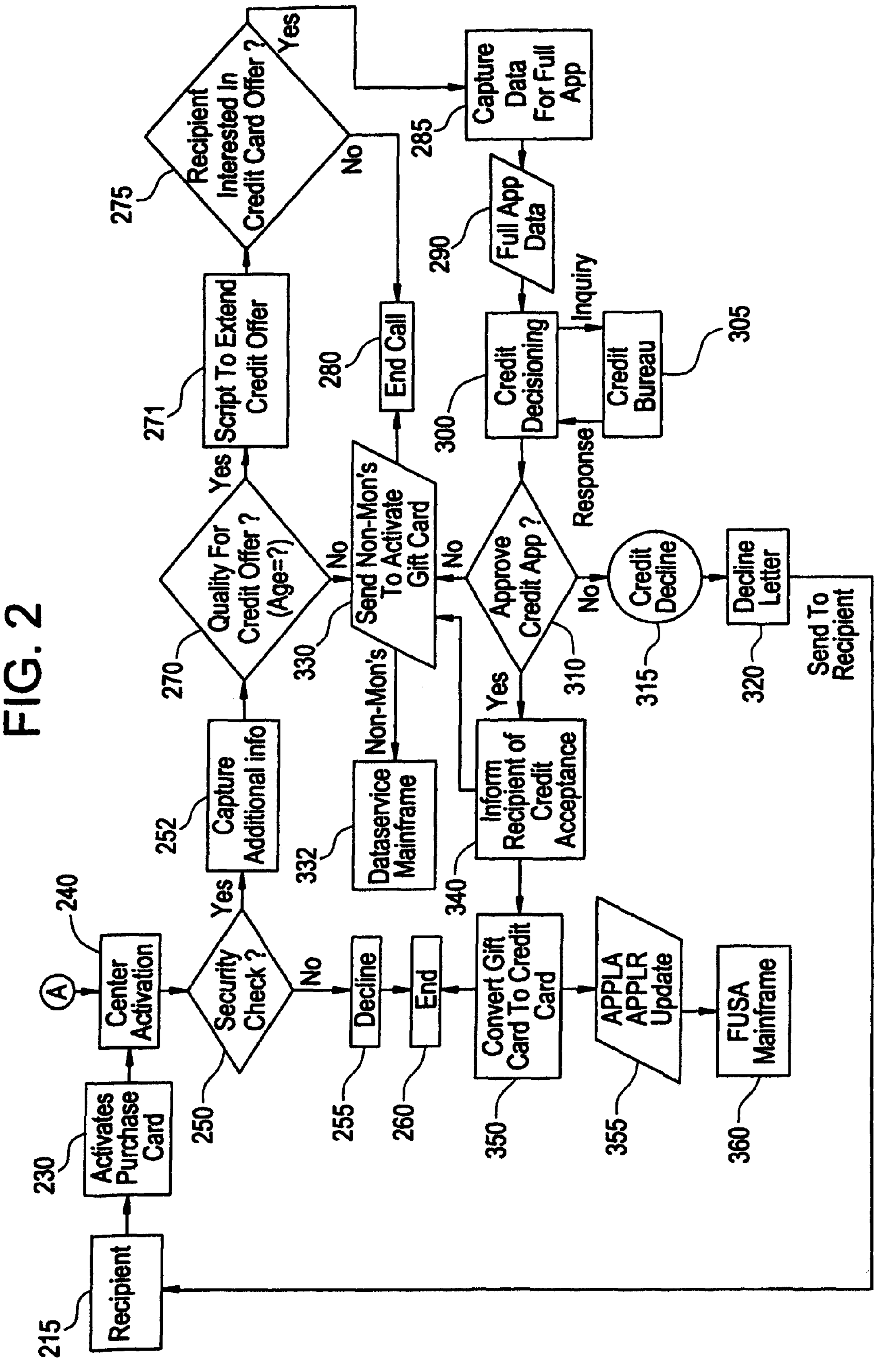
FIG. 2 shows a flow diagram for another portion of the purchase card system.

Before the purchase card can be used to make purchases, it must be activated as shown in FIG. 2 at 230. Activation may be accomplished in any suitable manner. For example, the recipient 215 of the card may place a telephone call to an activation center 240. Activation center 240 may act as a telemarketing vendor by verifying information about the recipient (i.e. name, address, telephone number, etc.) before the purchase card is activated. The activation center 240 may then transmit the data about the recipient to Data Service 200 to activate the purchase card for use. Activation center 240 may also modify information about a recipient, such as, for example, a change of address. Other forms of activation, such as by computer network may also be used.

During activation certain verifications may be made at 250 to ensure that the intended recipient 215 is the person attempting to activate the purchase card. These security checks 250 may entail questions about personal information (e.g., name, address, telephone number, etc.) or may utilize other well known methods of authenticating the recipient 215. If the person attempting to activate the purchase card does not pass the security check 250, the purchase card will be denied activation at 255 and the activation process may terminate at 260. If the person attempting to activate the purchase card passes the security check 250, they may be prompted at 252 for more information. The information may be used for subsequent security checks, should they be required, or to verify or complete the purchase card account information.

After activation the purchase card is ready for use. In some embodiments of the invention the activation process will end at this point. The recipient 215 may now use the purchase card to make purchases where ever, for example, VISA® cards are accepted. Each time a purchase is made using the card, the amount of the purchase will be debited from the card's available balance. The purchase card will continue to operate as long as a positive balance remains on the card. Some embodiments of the purchase card may have the capacity to have additional purchase value added to them after they have been activated.

If the recipient of a purchase card is someone other than the purchaser, the issuer of the card may notify the purchaser regarding various aspects of the card. For example, in one embodiment of the invention, the issuer could notify the purchaser that the purchase card has been received and activated by the intended recipient. An issuer may also notify a purchaser where the purchase card is being used, or what products are being purchased with the purchase card.

Some embodiments of the purchase card will include an expiration date. After the expiration date has passed the purchase card will be de-activated and cease to operate. In another embodiment of the present invention, a recipient or a purchaser of a purchase card may add to the balance of the purchase card account. This may take place in a manner substantially similar to the original purchasing of the purchase card. For example, a recipient of a purchase card may request that an amount be posted to the recipient's credit card and that the same amount then be credited to the recipient's purchase card account. Other methods of adding to the balance of a purchase card account may also be used.

Another embodiment of the invention allows the recipient 215 to convert the purchase card into a credit card. Conversion may be accomplished in the following manner. The recipient 215 calls the activation center 240 to activate the purchase card and the security check 250 may be performed in the usual manner. After passing the security check, the age of the recipient 215 is determined at 270. If the recipient 215 is an adult (e.g., over the age of 18) an offer to convert the purchase card into a credit card may be extended at 271. At step 275 the recipient 215 may decline the offer to convert, in which case the process may terminate at 280. If the recipient 215 elects to convert the purchase card to a credit card the activation center 240 may capture additional data 285 from recipient 215, in order to complete a credit card application. At step 290 the credit card application data is forwarded to a credit decisioning office 300. The credit decisioning office 300 may make inquiries to a credit bureau 305, for example, obtaining a credit report on the recipient 215. At 310 the decision is rendered whether to approve the credit card application. If the application for a credit card is declined at 315, the recipient 215 may be notified at 320. Notification may be in any suitable form, for example, a letter explaining the declined application may be mailed at 320 to the recipient 215. Other forms of notification may also be used to notify recipient 215 of the declined application.

Even though the credit card application is declined at 310, the purchase card is activated for use. At 330, the account settings allowing a card to be used at merchants are sent to the data service 200 and the card will be activated as a purchase card account. Information pertaining to the purchase card account is stored in a retrievable and accessible manner. For example, the purchase card account information may be stored in a computer 332.

If the decision at 310 is to accept the application for a credit card, the recipient 215 may be notified at 340. Again, notification may be in any suitable form, for example, a letter or other suitable notification. Regardless of the decision whether to convert the purchase card into a credit card, the purchase card is activated at the end of the activation call. If the purchase card is not already active, it may be activated at 345. At 350 the purchase card is converted to a credit card. The credit card will function in a manner usual for such credit instruments. For example, a credit limit may be assigned, periodic account activity statements may be generated and finance charges may be applied to any outstanding balance. In one embodiment, any remaining balance from the purchase card account may be transferred and applied to the credit card account. At 355 an update is sent to a retrievable data storage system, for example, computer 360. The update 355 sends credit card application decisions into a database.

In another embodiment of the purchase card, a financial institution (e.g., a bank) issues a credit card to a cardholder. The card may be a co-branded card issued in cooperation with a sponsor. In this embodiment, the sponsor offers a rebate to the cardholder based upon the dollar value amount of purchases made with the co-branded credit card. The rebate may apply to all purchases made or just to purchases made from the sponsor. The rebate may be calculated in a manner specified by the terms of the cardholder agreement or other disclosures to the cardholder. In one embodiment of the ±20 invention, disclosure about the rebate is provided to the cardholder in a separate form included with the cardholder agreement. For example, the sponsor may offer a flat percentage rebate for purchases made. In one embodiment of the invention, the card issuer calculates the rebate due the cardholder based on the balance paid.

In another embodiment, the sponsor notifies the financial institution of the amount of rebate to be awarded to the cardholder. The financial institution will then issue a purchase card for the amount of the rebate. The purchase card may be used for purchases in the above described manner, for example, everywhere VISA® is accepted, or the purchase card may be used for purchases solely with the sponsor or other designated entities.

Other embodiments and uses of the invention will be apparent to those skilled in to the art from consideration of the specification and practice of the invention disclosed herein. The specification and examples should be considered exemplary only. The scope of the invention is only limited by the claims appended hereto.

The invention claimed is:

1. A computer-implemented method for an issuer to create a stored value account as a rebate award, wherein the stored value account is affiliated with a predetermined transaction network and the issuer, the method comprising:

determining, by at least one computer processor, a rebate amount based upon one or more purchases made by a purchaser, wherein the rebate amount is a monetary amount comprising a percentage of a monetary value of the one or more purchases;

creating, by at least one computer processor, in a computer database a stored value account, the stored value account having a purchase value based on said rebate amount, wherein the independent stored value account comprises information about:

a) a stored value account number, and b) a stored value purchase amount;

wherein the stored value account is usable for purchases from merchants or types of merchants designated by the issuer or a sponsor of the card and are affiliated with the transaction network;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

2. The method of claim 1, wherein the stored value card is marked with at least one of transaction network identification indicia associated with the transaction network and issuer identification indicia associated with the issuer.

3. The method of claim 2, wherein the stored value account further comprises information about:

a cardholder's name, wherein the cardholder comprises the purchaser or the intended recipient.

4. The method of claim 3, wherein the stored value card is further marked with the cardholder's name before issuance.

5. The method of claim 1, wherein activation of the stored value card or account comprises activating the stored value card or account for a predetermined period of time.

6. The method of claim 1, wherein the purchaser designates the intended recipient of the stored value card.

7. The method of claim 1, wherein the intended recipient and the purchaser are the same person or entity.

8. The method of claim 1, wherein the purchaser or intended recipient may add funds to the stored value account.

9. The method of claim 1, further comprising:

disclosing terms of the rebate amount determination to the purchaser, wherein the act of determining the rebate amount is in accordance with the disclosed terms.

10. The method of claim 1, wherein the predetermined transaction network and the issuer are the same.

11. A computer-implemented method for an issuer to issue a stored value card as a rebate award, wherein the stored value card is affiliated with a predetermined transaction network and the issuer, the method comprising:

determining, by at least one computer processor, a rebate amount based upon one or more purchases made by a purchaser using cash or a credit card associated with a sponsor, wherein the rebate amount is a monetary amount comprising a percentage of a monetary value of the one or more purchases;

creating, by at least one computer processor, in a computer database a stored value card account, the stored value card account having a purchase value based on said rebate amount, wherein the stored value card account comprises information about:

a) a cardholder's name;

b) a stored value card account number; and c) a stored value card purchase amount, wherein the stored value card purchase amount initially comprises the rebate amount;

receiving a request for a stored value card associated with the stored value account;

issuing the stored value card, wherein the stored value card is marked with at least one of transaction network identification indicia associated with the transaction network, issuer identification indicia associated with the issuer, and sponsor identification indicia associated with the sponsor, and wherein the stored value card is usable for purchases from any merchant that is part of a set of merchants designated by the issuer or the sponsor of the card; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

12. The method of claim 11, wherein the credit card is associated with the sponsor.

13. The method of claim 11, wherein the merchants for which the stored value account or card is usable includes the sponsor.

14. The method of claim 11, wherein the credit card is associated with a sponsor, and wherein the rebate amount is determined based on purchases from entities affiliated with the sponsor, wherein the purchases are made using cash or the credit card.

15. The method of claim 11, wherein the recipient may add funds to the stored value account.

16. The method of claim 11, wherein the rebate amount is determined based on all purchases made with cash or the credit card.

17. The method of claim 11, wherein the rebate amount is determined based only on purchases made with specific merchants.

18. The method of claim 11, further comprising:

disclosing terms of the rebate amount determination to the purchaser, wherein the act of determining the rebate amount is in accordance with the disclosed terms.

19. The method of claim 11, further comprising, wherein the rebate amount is based on a flat percentage of the one or more purchases.

20. A computer-implemented system for an issuer to issue a stored value card as a rebate award, wherein the stored value card is affiliated with a predetermined transaction network and the issuer, the system comprising:

at least one processor for determining a rebate amount based upon one or more purchases made by a purchaser using cash or a credit card associated with a sponsor, wherein the rebate amount is a monetary amount comprising a percentage of a monetary value of the one or more purchases;

at least one processor for creating in a computer database an independent stored value card account, the stored value card account having a purchase value based on said rebate amount, wherein the independent stored value card account comprises information about:

a) a cardholder's name;

b) a stored value card account number; and c) a stored value card purchase amount, wherein the stored value card purchase amount initially comprises the rebate amount;

at least one processor for receiving a request for a stored value card associated with the stored value account; and at least one processor for issuing the stored value card, wherein the stored value card is marked with at least one of transaction network identification indicia associated with the transaction network, issuer identification indicia associated with the issuer, and sponsor identification indicia associated with the sponsor, and wherein the stored value card is usable for purchases only from merchants affiliated with the sponsor or which are part of a set of eligible merchants designated by the issuer or sponsor of the stored value card; and at least one processor for activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

21. A computer-implemented method for an issuer to create a stored value account as a rebate award, wherein the stored value account is affiliated with a predetermined transaction network and the issuer, the method comprising:

determining, by at least one computer processor, a rebate amount based upon one or more purchases made by a purchaser, wherein the rebate amount is a monetary amount comprising a percentage of a monetary value of the one or more purchases;

creating, by the at least one computer processor, in a computer database, a stored value account, the stored value account having a purchase value based on said rebate amount, wherein the independent stored value account comprises information about:

a) a stored value account number, and b) a stored value purchase amount;

wherein the stored value account is usable for purchases from merchants or types of merchants designated by the issuer or a sponsor of the card and are affiliated with the transaction network;

providing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

22. A computer-implemented method for an issuer to provide a stored value card as a rebate award, wherein the stored value card is affiliated with a predetermined transaction network and the issuer, the method comprising:

determining, by at least one computer processor, a rebate amount based upon one or more purchases made by a purchaser using cash or a credit card associated with a sponsor, wherein the rebate amount is a monetary amount comprising a percentage of a monetary value of the one or more purchases;

creating, by the at least one computer processor, in a computer database, a stored value card account, the stored value card account having a purchase value based on said rebate amount, wherein the stored value card account comprises information about:

a) a cardholder's name;

b) a stored value card account number; and c) a stored value card purchase amount, wherein the stored value card purchase amount initially comprises the rebate amount;

receiving a request for a stored value card associated with the stored value account;

providing the stored value card, wherein the stored value card is marked with at least one of transaction network identification indicia associated with the transaction network, issuer identification indicia associated with the issuer, and sponsor identification indicia associated with the sponsor, and wherein the stored value card is usable for purchases from any merchant that is part of a set of merchants designated by the issuer or the sponsor of the card; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

23. A computer-implemented system for an issuer to provide a stored value card as a rebate award, wherein the stored value card is affiliated with a predetermined transaction network and the issuer, the system comprising:

at least one processor for determining a rebate amount based upon one or more purchases made by a purchaser using cash or a credit card associated with a sponsor, wherein the rebate amount is a monetary amount comprising a percentage of a monetary value of the one or more purchases;

at least one processor for creating in a computer database an independent stored value card account, the stored value card account having a purchase value based on said rebate amount, wherein the independent stored value card account comprises information about:

a) a cardholder's name;

b) a stored value card account number; and c) a stored value card purchase amount, wherein the stored value card purchase amount initially comprises the rebate amount;

at least one processor for receiving a request for a stored value card associated with the stored value account; and at least one processor for providing the stored value card, wherein the stored value card is marked with at least one of transaction network identification indicia associated with the transaction network, issuer identification indicia associated with the issuer, and sponsor identification indicia associated with the sponsor, and wherein the stored value card is usable for purchases only from merchants affiliated with the sponsor or which are part of a set of eligible merchants designated by the issuer or sponsor of the stored value card; and at least one processor for activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

24. A computer-implemented method for an issuer to create a stored value account as a rebate award, wherein the stored value account is affiliated with a predetermined transaction network and the issuer, the method comprising:

determining, by at least one computer processor, a rebate amount based upon one or more purchases made by a purchaser, wherein the rebate amount is a monetary amount comprising a based on a monetary value of the one or more purchases;

creating, by the at least one computer processor, in a computer database; a stored value account, the stored value account having a purchase value based on said rebate amount, wherein the independent stored value account comprises information about:

a) a stored value account number, and b) a stored value purchase amount;

wherein the stored value account is usable for purchases from merchants or types of merchants designated by the issuer or a sponsor of the card and are affiliated with the transaction network;

providing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

* * * * *